(12) United States Patent
Richeson et al.

(10) Patent No.: US 10,077,516 B2
(45) Date of Patent: Sep. 18, 2018

(54) POLYMER COMPOSITIONS AND NONWOVEN MATERIALS PREPARED THEREFROM

(71) Applicant: ExxonMobil Chemical Patents Inc., Baytown, TX (US)

(72) Inventors: Galen C. Richeson, Humble, TX (US); Jennifer J. Austin, The Woodlands, TX (US); James N. Coffey, League City, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 87 days.

(21) Appl. No.: 15/513,318

(22) PCT Filed: Aug. 5, 2015

(86) PCT No.: PCT/US2015/043721
§ 371 (c)(1),
(2) Date: Mar. 22, 2017

(87) PCT Pub. No.: WO2016/036466
PCT Pub. Date: Mar. 10, 2016

(65) Prior Publication Data
US 2018/0230629 A1 Aug. 16, 2018

Related U.S. Application Data

(60) Provisional application No. 62/083,937, filed on Nov. 25, 2014, provisional application No. 62/046,387, filed on Sep. 5, 2014, provisional application No. 62/046,378, filed on Sep. 5, 2014.

(51) Int. Cl.
| | | |
|---|---|---|
| *C08L 23/16* | (2006.01) | |
| *D04H 1/4291* | (2012.01) | |
| *D01F 6/46* | (2006.01) | |
| *C08L 23/14* | (2006.01) | |
| *C08L 23/12* | (2006.01) | |

(52) U.S. Cl.
CPC ........... *D04H 1/4291* (2013.01); *C08L 23/12* (2013.01); *C08L 23/142* (2013.01); *C08L 23/16* (2013.01); *D01F 6/46* (2013.01); *C08L 2203/12* (2013.01); *C08L 2205/025* (2013.01); *C08L 2207/02* (2013.01)

(58) Field of Classification Search
CPC ....... D04H 1/4291; D01F 6/46; C08L 23/142; C08L 23/16; C08L 23/12; C08L 2203/12; C08L 2207/02; C08L 2205/025
See application file for complete search history.

(56) References Cited

U.S. PATENT DOCUMENTS

| | | | |
|---|---|---|---|
| 2005/0106978 A1 | 5/2005 | Cheng et al. | |
| 2005/0165173 A1* | 7/2005 | Autran et al. | C08L 23/10 525/333.7 |
| 2008/0182940 A1 | 7/2008 | Dharmarajan et al. | |
| 2009/0111347 A1* | 4/2009 | Peng et al. | D01F 1/10 442/334 |
| 2010/0228214 A1* | 9/2010 | Bornemann et al. | B32B 5/24 604/372 |

FOREIGN PATENT DOCUMENTS

| | | |
|---|---|---|
| EP | 2 325 248 | 5/2011 |
| WO | 2014/197141 | 12/2014 |
| WO | 2014/204778 | 12/2014 |
| WO | 2014/204780 | 12/2014 |

* cited by examiner

*Primary Examiner* — Nathan M Nutter

(57) ABSTRACT

The invention relates to a fiber comprising a blend of 10-50 wt % of a polymer blend modifier and 50-90 wt % of a propylene-based elastomer; 5-50 wt % of a propylene-modifier and 50-95 wt % of a propylene-based elastomer; and 5-35 wt % of a polymer blend modifier and 65-95 wt % of a propylene-modifier. The polymer blend modifier has a first propylene-based polymer and a different second propylene-based polymer that is a propylene homopolymer or a copolymer of propylene and ethylene and a $C_4$ to $C_{10}$ alpha-olefin. The propylene-modifier is a propylene homopolymer or a copolymer of propylene with 0.5-4 wt % ethylene or $C_4$ to $C_{10}$ alpha-olefins. The propylene-based elastomer is propylene and 5-25 wt % of one or more $C_2$ to $C_4$-$C_{12}$ alpha-olefins and has a triad tacticity greater than 90% and a heat of fusion less than 75 J/g.

22 Claims, 10 Drawing Sheets

POLYMER COMPOSITIONS AND NONWOVEN MATERIALS PREPARED THEREFROM

PRIORITY CLAIM TO RELATED APPLICATIONS

This present application is a National Stage Application of International Application No. PCT/US2015/043721 filed Aug. 5, 2015, which claims the benefit of and priority to U.S. Application Ser. No. 62/046,378 filed Sep. 5, 2014, U.S. Application Ser. No. 62/046,387 filed Sep. 5, 2014, and U.S. Application Ser. No. 62/083,937 filed Nov. 25, 2014, the disclosures of which are fully incorporated herein by their reference.

FIELD OF THE INVENTION

This invention relates to propylene-based polymer compositions and to nonwoven compositions prepared therefrom.

BACKGROUND OF THE INVENTION

The use of various thermoplastic resins to make fibers and fabrics is well known. In particular, propylene-based polymers and copolymers (and in particular, propylene-based elastomers) are well known in the art for their usefulness in a variety of applications, including the manufacture of nonwoven fabrics. Such fabrics have a wide variety of uses, such as in medical and hygiene products, cleaning devices, clothing, filter media, and sorbent products. Nonwoven fabrics are particularly useful in hygiene products, such as baby diapers and wipes, adult incontinence products, training pads, puppy pads, and feminine hygiene products. An important aspect of these fabrics, particularly in hygiene applications, is the ability to produce aesthetically pleasing fabrics, i.e., fabrics that are soft to the touch, and that have good leakage performance, i.e., fabrics that are stretchable and conform to the body of the wearer.

Production of nonwoven fabrics using commercially available propylene-based polymers having a melt flow rate (MFR) less than 50 g/10 min in the elastic layers can be difficult, because the low MFR of such polymers requires high melt temperatures and high pressures to melt blow into fibers. High process temperatures can cause undesirable degradation in the extruder, while high pressures limit the throughput rate of the melt blowing equipment, as illustrated in FIG. 3. Previously, some propylene-based polymers have been blended with an additional polymer or polymers post-reactor, often isotactic propylene homopolymers, and then visbroken with peroxide to achieve a higher MFR polymer for use in elastic layers. These additional process steps typically increase manufacturing cost and complexity to the process and may reduce the elastic performance of the resulting nonwoven fabrics.

Moreover, production of nonwoven fabrics using commercially available propylene-based polymers having these desirable attributes of softness and leakage performance can be obtainable by including a selection of additives such as slips and/or by modifying of processing conditions to achieve a certain fiber size. Some slip agents may migrate out of the polymer during processing and can deposit on equipment.

International Patent Application No. PCT/US2014/036335, describes propylene-based compositions for melt-spun nonwoven compositions. International Patent Application No. PCT/US2014/042119, describes blends of propylene-based elastomers and broad molecular weight polypropylene or impact copolymers for use in nonwoven articles. International Patent Application No. PCT/US2014/042127, describes blends of propylene-based elastomers and impact copolymers for use in nonwoven articles.

It is therefore desirable to form the elastic layers of nonwoven fabrics from propylene-based polymers having a higher MFR (i.e., greater than 50 g/10 min) without additional complex steps to the existing manufacturing process. Such fabrics can be produced under broader process conditions, and at higher throughput rates and lower costs. It would also be desirable to form fabrics that exhibit a desirable balance of retractive force and permanent set, and form nonwoven fabrics with high barrier properties. It is appreciated that such fabrics can be used for thermal and sonic insulation.

SUMMARY OF THE INVENTION

Figure 1:
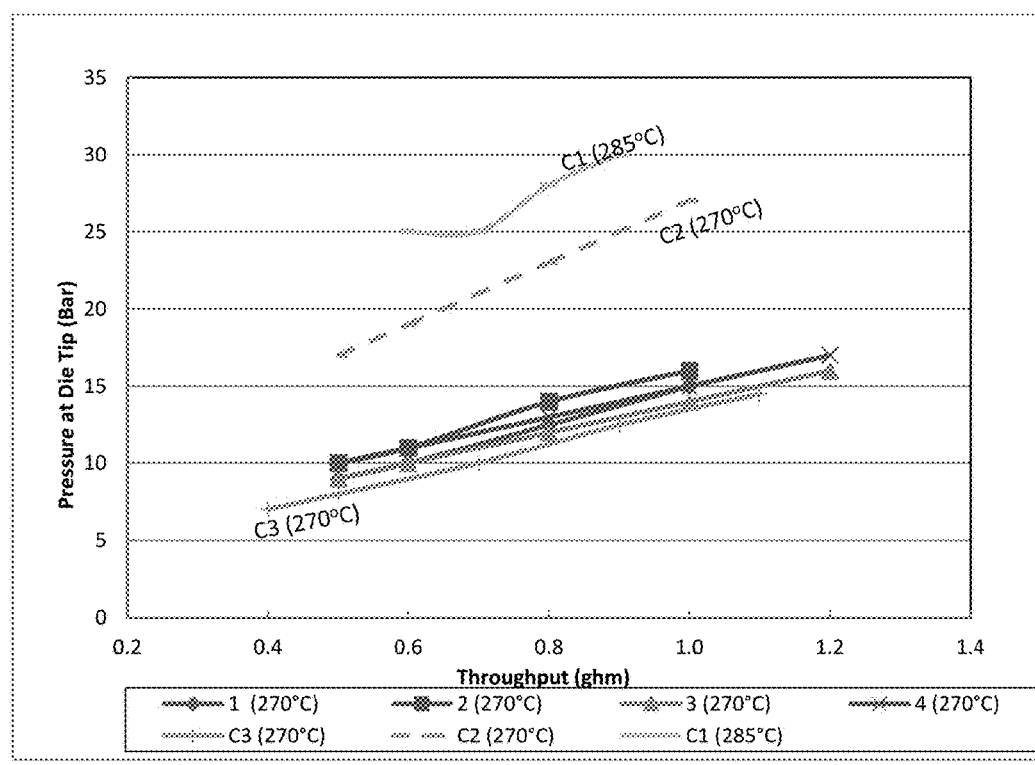
FIG. 1 shows processability parameters for polymer blends for nonwoven applications with a polymer blend modifier.

The invention relates to a fiber comprising a polymer blend of from about 10 to about 50 wt % of a polymer blend modifier and from about 50 to about 90 wt % of a propylene-based elastomer, wherein the polymer blend modifier comprises a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer, wherein the polymer blend modifier has a MFR of greater than about 1,000 g/10 min to less than about 10,000 g/10 min, and wherein the propylene-based elastomer has a MFR of less than about 100 g/10 min.

The invention relates to a fiber comprising a polymer blend of from about 5 to about 50 wt % of a propylene-modifier and from about 50 to about 95 wt % of a propylene-based elastomer, wherein the propylene-modifier is a homopolymer of propylene or a copolymer or propylene with from about 0.5 to about 4 wt % ethylene or $C_4$ to $C_{10}$ alpha-olefin comonomer derived units, and wherein the propylene-based elastomer comprises propylene and from about 5 to about 25 wt % units derived from one or more $C_2$ to $C_4$-$C_{12}$ alpha-olefins and has a triad tacticity greater than about 90% and a heat of fusion less than about 75 J/g.

The invention relates to a fiber comprising a polymer blend of from about 5 to about 35 wt % of a polymer blend modifier and from about 65 to about 95 wt % of a propylene-modifier, wherein the polymer blend modifier comprises a first propylene-based polymer, wherein the first propylene-based polymer is a homopolymer of propylene or a copolymer of propylene and ethylene or a $C_4$ to $C_{10}$ alpha-olefin and a second propylene-based polymer, wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer and wherein the polymer blend modifier has a MFR of greater than or equal to about 20 g/10 min to less than about 10,000 g/10 min, and wherein the propylene-modifier has a MFR of greater than or equal to about 100 g/10 min to less than about 5,000 g/10 min.

DETAILED DESCRIPTION OF THE INVENTION

Fibers, nonwoven fabrics, and other nonwoven articles comprising a blend of at least one propylene-based elastomer and a low molecular weight/high melt flow rate homopolymer of propylene or a copolymer of propylene and ethylene or a $C_4$ to $C_{10}$ alpha-olefin are provided herein, as well as methods for forming the same, are disclosed herein.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

"Propylene-based" or "predominantly propylene-based" as used herein, is meant to include any polymer comprising propylene, either alone or in combination with one or more comonomers, in which propylene is the major component (i.e., greater than 50 mol % propylene).

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

"Visbreaking," as used herein, is a process for reducing the molecular weight of a polymer by subjecting the polymer to chain scission. The visbreaking process also increases the MFR of a polymer and may narrow its molecular weight distribution. Several different types of chemical reactions can be employed for visbreaking propylene-based polymers. An example is thermal pyrolysis, which is accomplished by exposing a polymer to high temperatures, e.g., in an extruder at 270° C. or higher. Other approaches are exposure to powerful oxidizing agents and exposure to ionizing radiation. The most commonly used method of visbreaking in commercial practice is the addition of a prodegradant to the polymer. A prodegradant is a substance that promotes chain scission when mixed with a polymer, which is then heated under extrusion conditions. Examples of prodegradants used in commercial practice are alkyl hydroperoxides and dialkyl peroxides. These materials, at elevated temperatures, initiate a free radical chain reaction resulting in scission of polypropylene molecules. The terms "prodegradant" and "visbreaking agent" are used interchangeably herein. Polymers that have undergone chain scission via a visbreaking process are said herein to be "visbroken." Such visbroken polymer grades, particularly polypropylene grades, are often referred to in the industry as "controlled rheology" or "CR" grades.

As used herein, "nonwoven fabric" means a web structure of individual fibers or filaments that are interlaid, but not in an identifiable manner as in a knitted fabric. In nonwoven fabrics, the fibers are processed directly into a planar sheet-like fabric structure and then are either bonded chemically, thermally, or interlocked mechanically (or both) to achieve a cohesive fiber. Furthermore, "nonwoven" refers to a textile material that has been produced by methods other than weaving.

Polymer Blend Modifiers

The Polymer Blend Modifiers ("PBMs") useful for making the fibers and fabrics of the invention comprise a first predominantly propylene-based polymer, wherein the first predominantly propylene-based polymer is a homopolymer of propylene or a copolymer of propylene and ethylene or a $C_4$ to $C_{10}$ alpha-olefin; and a second predominantly propylene-based polymer, wherein the second predominantly propylene-based polymer is a homopolymer of propylene or comprises a comonomer of ethylene or a $C_4$ to $C_{10}$ alpha-olefin; wherein the second predominantly propylene-based polymer is compositionally different than the first predominantly propylene-based polymer.

Methods of Preparing PBMs

A solution polymerization process for preparing a PBM is generally performed by a system that includes a first reactor, a second reactor in parallel with the first reactor, a liquid-phase separator, a devolatilizing vessel, and a pelletizer. The first reactor and second reactor may be, for example, continuously stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final PBM. For fiber compositions, ethylene and hexene are particularly preferred comonomers for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer.

It should be appreciated that any number of additional reactors may be employed to produce other polymers that may be integrated with (e.g., grafted) or blended with the first and second polymers. Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer PBMs, particularly in cases in which one of the polymers of the PBM has a weight average molecular weight less than 100,000 g/mol, and even more particularly between 10,000 g/mol and 60,000 g/mol. The concentration of polymer in the polymer lean phase may be further reduced by catalyst selection. Catalysts of Formula I (described below), particularly dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis (2-methyl-4-phenylindenyl) hafnium dimethyl.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the PBM and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the PBM is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art. International Publication No. WO2013/134038, incorporated herein by reference, generally describes the method of preparing PBMs.

Polymers of the PBMs

Preferred polymers of the PBM are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

In any embodiment, one or more polymers of the PBM may comprise one or more propylene-based polymers, which comprise propylene and from about 5 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more polymers of the PBM may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the PBM of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the PBM (as determined by DSC) may be less than about 130° C., or less than about 120° C., or less than about 115° C., or less than about 110° C., or less than about 100° C., or less than about 90° C. In any embodiment, the Tm of the one or more polymers of the PBM may be greater than about 25° C., or greater than about 30° C., or greater than about 35° C., or greater than about 40° C. Tm of the one or more polymers of the PBM can be determined by taking 5 to 10 mg of a sample of the one or more polymers, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., ramping the temperature at a rate of 10° C. per minute up to 200° C., maintaining the temperature for 5 minutes, and recording the temperature as Tm.

In one or more embodiments, the crystallization temperature (Tc) of the one or more polymers of the PBM (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc of the polymer is greater than about 0° C., or greater than about 5° C., or greater than about 10° C., or greater than about 15° C., or greater than about 20° C. In any embodiment, the Tc lower limit of the polymer may be 0° C., 5° C., 10° C., 20° C., 30° C., 40° C., 50° C., 60° C., and 70° C.; and the Tc upper limit temperature may be 120° C., 110° C., 100° C., 90° C., 80° C., 70° C., 60° C., 50° C., 40° C., 30° C., 25° C., and 20° C. with ranges from any lower limit to any upper limit being contemplated. Tc of the polymer blend can be determined by taking 5 to 10 mg of a sample of the polymer blend, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., and recording the temperature as Tc.

The polymers suitable for in the PBM are said to be "semi-crystalline," meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer of the PBM can have a level of isotacticity expressed as percentage of isotactic triads (three consecutive propylene units), as measured by $^{13}C$ NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Pat. No. 7,232,871.

The semi-crystalline polymer of the PBM may have a tacticity index m/r ranging from a lower limit of 4, or 6 to an upper limit of 10, or 20, or 25. The tacticity index, expressed herein as "m/r", is determined by $^{13}C$ nuclear magnetic resonance ("NMR"). The tacticity index m/r is calculated as defined by H. N. Cheng in *Macromolecules*, 17, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer of the PBM may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature and determined according to ASTM D-792.

In an embodiment, the PBM has a melt viscosity, measured at 190° C. within the range of from about 800 or 1,000 or 5,000 cP to about 10,000 or 15,000 cP. In an embodiment, the PBM has a Melt Flow Rate ("MFR", 230° C./2.16 kg) within the range of from about 1,000 or 2,000 g/10 min to about 5,000 or 7,500 or 10,000 g/10 min.

In one or more embodiments, the semi-crystalline polymer of the PBM can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ (also referred to as polydispersity index) where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001. In one or more embodiments, the PBM can have a polydispersity index of from about 1.5 to about 6.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 m glass pre-filter and subsequently through a 0.1 m Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$[K_O c/\Delta R(\theta,c)] = [1/MP(\theta)] + 2A_2 c$$

where $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_O$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and $\lambda$=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone Bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v = (\Sigma c_i M_i^\alpha / \Sigma c_i)^{1/\alpha}$$

In one or more embodiments, the semi-crystalline polymer of the PBM may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

The polymers that may be used in the fiber compositions disclosed herein generally include any of the polymers formed as disclosed in International Publication No. WO2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

Polymers and blended polymer products are also provided. In any embodiment, one or more of the polymers described herein may be blended with another polymer, such as another polymer described herein, to produce a physical blend of polymers.

Catalysts/Activators for Preparing PBMs

In any embodiment, the catalyst systems used for producing semi-crystalline polymers of the PBM may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

In any embodiment, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3',5'-di-tert-butylphenyl) indenyl) zirconium dimethyl, (dimethylsilyl)bis(2-methyl-4-(3',5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz (f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclopropylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers of the PBM may comprise a cationic component. In any embodiment, the cationic component may have the formula $[R^1R^2R^3AH]^+$, where A is nitrogen, $R^1$ and $R^2$ are together a $-(CH_2)_a-$ group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

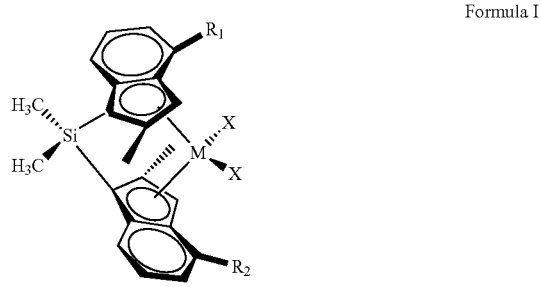

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalyst. A particularly advantageous activator is dimethylaniliniumtetrakis(heptafluoronaphthyl) borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x-Al-O)_n$, which is a cyclic compound, or $R^x(R^x-Al-O)_nAlR^x_2$, which is a linear compound. Most commonly, alumoxane is believed to be a mixture of the cyclic and linear compounds. In the general alumoxane formula, $R^x$ is independently a $C_1-C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1-C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Solvents for Preparing PBMs

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

International Publication No. WO2013/134038 generally describes the catalysts, activators, and solvents used to prepare the polymer blend used in the fiber compositions.

Propylene-Based Elastomers

The polymer blends used to form the fibers and fabrics described herein comprise one or more propylene-based elastomers ("PBEs"). The PBE comprises propylene and from about 5 to about 25 wt % of one or more comonomers selected from ethylene and/or $C_4$-$C_{12}$ α-olefins. The α-olefin comonomer units may be derived from ethylene, butene, pentene, hexene, 4-methyl-1-pentene, octene, or decene. In preferred embodiments the α-olefin is ethylene. In some embodiments, the propylene-based polymer composition consists essentially of propylene and ethylene, or consists only of propylene and ethylene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

The PBE may include at least about 5 wt %, at least about 6 wt %, at least about 7 wt %, or at least about 8 wt %, or at least about 9 wt %, or at least about 10 wt %, or at least about 12 wt % ethylene-derived units, where the percentage by weight is based upon the total weight of the propylene-derived and ethylene-derived units. The PBE may include up to about 30 wt %, or up to about 25 wt %, or up to about 22 wt %, or up to about 20 wt %, or up to about 19 wt %, or up to about 18 wt %, or up to about 17 wt % ethylene-derived units, where the percentage by weight is based upon the total weight of the propylene-derived and ethylene-derived units. In some embodiments, the PBE may comprise from about 5 to about 25 wt % ethylene-derived units, or from about 7 wt % to about 20 wt % ethylene, or from about 9 to about 18 wt % ethylene-derived units, where the percentage by weight is based upon the total weight of the propylene-derived and ethylene-derived units.

The PBE may include at least about 70 wt %, or at least about 75 wt %, or at least about 80 wt %, or at least about 81 wt % propylene-derived units, or at least about 82 wt %, or at least about 83 wt % propylene-derived units, where the percentage by weight is based upon the total weight of the propylene-derived and α-olefin derived units. The PBE may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and α-olefin derived units.

The Tm of the PBE (as determined by DSC) may be less than about 115° C., or less than about 110° C., or less than about 100° C., or less than about 95° C., or less than about 90° C. In some embodiments, the PBE may have two melting peaks as determined by DSC. In other embodiments, the PBE may have a single melting peak as determined by DSC.

The PBE may be characterized by its heat of fusion (Hf), as determined by DSC. The PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. The PBE may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g, or less than 25 J/g.

The DSC procedures for determining Tm and Hf of the PBE include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is heated at 10° C./min to attain a final temperature of about 200° C. The sample is kept at 200° C. for 5 minutes. Then a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%. Triad tacticity is determined by the methods described in U.S. Pat. No. 7,232,871.

The PBE may have a tacticity index m/r ranging from a lower limit of 4 or 6 to an upper limit of 8 or 10 or 12.

The PBE may have a % crystallinity of from about 0.5% to about 40%, or from about 1% to about 30%, or from about 5% to about 25%, determined according to DSC procedures.

The PBE may have a density of from about 0.85 g/cm³ to about 0.92 g/cm³, or from about 0.86 g/cm³ to about 0.90 g/cm³, or from about 0.86 g/cm³ to about 0.89 g/cm³ at room temperature, as measured per the ASTM D-792 test method.

The PBE can have a melt index (MI) (ASTM D-1238, 2.16 kg @ 190° C.), of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

The PBE may have a melt flow rate (MFR), as measured according to ASTM D-1238 (2.16 kg weight @ 230° C.), greater than about 1 g/10 min, or greater than about 2 g/10 min, or greater than about 5 g/10 min, or greater than about 8 g/10 min, or greater than about 10 g/10 min. The PBE may have an MFR less than about 1,000 g/10 min, or less than about 750 g/10 min, or less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In some embodiments, the PBE may have an MFR from about 1 to about 100 g/10 min, or from about 2 to about 75 g/10 min, or from about 5 to about 50 g/10 min.

In some embodiments, the PBE may be a reactor grade polymer, as defined above. In other embodiments, the PBE may be a polymer that has been visbroken after exiting the reactor to increase the MFR.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta b$ is the intrinsic viscosity of the polymer and $\eta l$ is the intrinsic viscosity of a linear polymer of the same viscosity-averaged molecular weight (Mv) as the polymer. $\eta l = K M v \alpha$, K and $\alpha$ are measured values for linear polymers and should be obtained on the same instrument as the one used for the g' index measurement.

The PBE may have a weight average molecular weight (Mw) of from about 50,000 to about 5,000,000 g/mol, or from about 75,000 to about 1,000,000 g/mol, or from about 100,000 to about 500,000 g/mol, or from about 125,000 to about 300,000 g/mol.

The PBE may have a number average molecular weight (Mn) of from about 2,500 to about 2,500,000 g/mol, or from about 5,000 to about 500,000 g/mol, or from about 10,000 to about 250,000 g/mol, or from about 25,000 to about 200,000 g/mol.

The PBE may have a Z-average molecular weight (Mz) of from about 10,000 to about 7,000,000 g/mol, or from about 50,000 to about 1,000,000 g/mol, or from about 80,000 to about 700,000 g/mol, or from about 100,000 to about 500,000 g/mol.

The molecular weight distribution (MWD, equal to Mw/Mn) of the PBE may be from about 1 to about 40, or from about 1 to about 15, or from about 1.8 to about 5, or from about 1.8 to about 3.

Optionally, the propylene-based polymer compositions may also include one or more dienes. In embodiments where the propylene-based polymer compositions comprises a diene, the diene may be present at from 0.05 wt % to about 6 wt % diene-derived units, or from about 0.1 wt % to about 5.0 wt % diene-derived units, or from about 0.25 wt % to about 3.0 wt % diene-derived units, or from about 0.5 wt % to about 1.5 wt % diene-derived units, where the percentage by weight is based upon the total weight of the propylene-derived, alpha-olefin derived, and diene-derived units.

In one or more embodiments, the PBE can optionally be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)non-ene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In one or more embodiments, the grafted PBE comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment, wherein the graft monomer is maleic anhydride, the maleic anhydride concentration in the grafted polymer is preferably in the range of about 1 to about 6 wt %, preferably at least about 0.5 wt %, and highly preferably about 1.5 wt %.

In some embodiments, the PBE is a reactor blend of a first polymer component and a second polymer component. Thus, the comonomer content of the PBE can be adjusted by adjusting the comonomer content of the first polymer component, adjusting the comonomer content of second polymer component, and/or adjusting the ratio of the first polymer component to the second polymer component present in the propylene-based polymer composition. In such embodiments, the first polymer component may comprise propylene and ethylene and have an ethylene content of greater than 10 wt % ethylene, or greater than 12 wt % ethylene, or greater than 13 wt % ethylene, or greater than 14 wt % ethylene, or greater than 15 wt % ethylene, and an ethylene content that is less than 20 wt % ethylene, or less than 19 wt % ethylene, or less than 18 wt % ethylene, or less than 17 wt % ethylene, or less than 16 wt % ethylene, where the percentage by weight is based upon the total weight of the propylene-derived and ethylene derived units of the first polymer component. In such embodiments, the second polymer component may comprise propylene and ethylene and have an ethylene content of greater than 2 wt % ethylene, or greater than 3 wt % ethylene, or greater than 4 wt % ethylene, or greater than 5 wt % ethylene, or greater than 6 wt % ethylene, and an ethylene content that is less than 10 wt % ethylene, or less than 9.0 wt % ethylene, or less than 8 wt % ethylene, or less than 7 wt % ethylene, or less than 6 wt % ethylene, or less than 5 wt % ethylene, where the percentage by weight is based upon the total weight of the propylene-derived and ethylene derived units of the second polymer component. In such embodiments, the PBE may comprise from 3 to 25 wt % of the second polymer component, or from 5 to 20 wt % of the second polymer component, or from 7 to 18 wt % of the second polymer component, or from 10 to 15 wt % of the second polymer component, and from 75 to 97 wt % of the first polymer component, or from 80 to 95 wt % of the first polymer component, or from 82 to 93 wt % of the first polymer component, or from 85 to 90 wt % of the first polymer component, based on the weight of the PBE.

Polymerization Process for Preparing PBEs

Polymerization of the PBE is conducted by reacting monomers in the presence of a catalyst system described herein at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

Further description of exemplary methods suitable for preparation of the PBEs described herein may be found in U.S. Pat. Nos. 6,881,800; 7,803,876; 8,013,069; and 8,026,323.

The triad tacticity and tacticity index of the PBE may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

Too much comonomer may reduce the crystallinity provided by the crystallization of stereoregular propylene derived sequences to the point where the material lacks strength; too little and the material may be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157, whose test methods are also fully applicable for the various measurements referred to in this specification and claims and which contains more details on GPC measurements, the determination of ethylene content by NMR and the DSC measurements.

The catalyst systems used for producing the PBE may comprise a metallocene compound, such as the catalyst used to prepare a PBM described above.

Suitable PBEs for use in the present invention include Vistamaxx™ grades available from ExxonMobil Chemical, including Vistamaxx™ 7050 and Vistamaxx™ 6202.

Propylene Modifiers

The Propylene Modifiers ("PMs") useful for making the fibers and fabrics of the invention is a homopolymer of propylene or a copolymer of propylene and within the range from 0.05 or 0.1 or 0.5 wt % to 2.0 or 4.0 wt % ethylene or $C_4$ to $C_{10}$ α-olefin comonomer derived units. Preferably, the PMs useful herein are a homopolymer of propylene. The PM is preferably a high crystallinity polypropylene, having a crystallinity of at least 40% and less than about 75% as determined by DSC. Preferably, the polypropylene has a melting point temperature ("$T_m$", DSC) within the range of from 130° C. or 140° C. or 150° C. to 160° C. or 165° C. or 170° C. In an embodiment, the PM has a Melt Flow Rate ("MFR", 230° C./2.16 kg) within the range of from about 100 or 500 or 1,000 g/10 min to about 1,500 or 2,000 or 3,000 or 5,000 or 7,500 or 10,000 g/10 min. In an embodiment, the PM has a melt viscosity at 190° C. within the range of from about 2,000 to about 15,000 cP. In a preferred embodiment, the PM is visbroken or a masterbatch.

Catalysts/Activators for Preparing PMs

The PMs can be produced with a catalyst system comprising one or more metallocenes. As used herein "metallocene" refers generally to compounds represented by the formula $Cp_mMR_nX_q$ wherein Cp is a cyclopentadienyl ring which may be substituted or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1-3, n=0-3, q=0-3, and the sum of m+n+q is equal to the oxidation state of the transition metal. Methods for preparing and using these types of metallocenes are well known. These metallocenes are discussed extensively in U.S. Pat. Nos. 4,769,510; 4,933,403; 5,120,867; and 5,314,973; each fully incorporated herein by reference.

Metallocenes are generally used in combination with some form of activator in order to create an active catalyst system. Ionizing activators may also be used with metallocenes. Ionizing activators may be neutral or ionic, or compounds such as tri(n-butyl)ammonium tetrakis(pentafluorophenyl)boron, which ionize the neutral metallocene compound. Such ionizing compounds may contain an active proton, or some other cation associated with but not coordinated or only loosely coordinated to the remaining ion of the ionizing compound. Combinations of activators may also be used; see for example, International Publication No. WO94/07928.

The metallocene catalyst systems described above are preferably fixed on a support material. Preferably, the support material is a porous particulate material, such as talc, inorganic oxides, inorganic chlorides and resinous materials such as polyolefin or polymeric compounds.

The preferred support materials are porous inorganic oxide materials, which include those from the Periodic Table of Elements of Groups 2, 3, 4, 5, 13 or 14 metal oxides. Silica, alumina, silica-alumina, and mixtures thereof are most preferred. Other inorganic oxides that may be employed either alone or in combination with the silica, alumina or silica-alumina, are magnesia, titania, zirconia, and the like.

It is also appreciated that the PM can be prepared using a Ziegler-Natta based catalyst system.

Polymerization Process for Preparing PMs

The catalyst systems may be used to polymerize propylene and optionally comonomers in any process including gas, slurry or solution phase or high pressure autoclave processes. Preferably, a gas or slurry phase process is used, most preferably a bulk liquid propylene polymerization process is used.

In the preferred embodiment, this invention is directed toward the bulk liquid polymerization and copolymerization of propylene or ethylene, particularly propylene, in a slurry or gas phase polymerization process, particularly a slurry polymerization process. Another embodiment involves copolymerization reactions of propylene or ethylene, particularly propylene, with one or more of the alpha-olefin monomers having from 4 to 20 carbon atoms, preferably 4-12 carbon atoms, for example alpha-olefin comonomers of ethylene, butene-1, pentene-1, 4-methylpentene-1, hexene-1, octene-1, decene-1, and cyclic olefins such as styrene, cyclopentene or norbornene. Other suitable monomers include polar vinyl, diolefins such as dienes, for example, 1,3-butadiene, 1,4-hexadiene, norbornadiene or vinylnorbornene, acetylene and aldehyde monomers.

In another embodiment, propylene is polymerized with at least two different comonomers to form a terpolymer and the like, the preferred comonomers are a combination of alpha-olefin monomers having 3 to 10 carbon atoms, more preferably 3 to 8 carbon atoms, and/or dienes having 4 to 10 carbon atoms.

Typically, in a gas phase polymerization process, a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922; and 5,436,304 all of which are fully incorporated herein by reference.)

A slurry polymerization process generally uses pressures in the range of about 1 to about 500 atmospheres or even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be, for example, an alkane or a cycloalkane. The medium employed should be liquid under the conditions of polymerization and relatively inert. Non-limiting examples of liquid mediums include hexane and isobutane.

Suitable PMs for use in the present invention include Achieve™ grades available from ExxonMobil Chemical, including Achieve™ 6936G2. The present invention is not limited to Achieve™ grades as the propylene-based polymer. It is also appreciated that the PM of the present invention can be prepared with Ziegler-Natta based catalyst systems. It is appreciated that other propylene-based polymers may be suitable for use in the present invention, including those available from LyondellBasell Industries (LBI), Borealis, PolyMirae, and Total.

Polymer Blends

In an embodiment, polymer blends according to the present invention may comprise at least one PBM and at least one PBE. The blend may comprise from about 10 to about 60 wt % PBM, or from about 25 to about 50 wt % PBM. The blends may comprise from about 5 to about 95 wt % PBE. In another embodiment, polymer blends according to the invention may include a blend of one PBM and one PBE with a blend of one PM and one PBE. In an embodiment, polymer blends according to the present invention may comprise at least one PM and at least one PBE. The blend may comprise from about 5 to about 15 wt % PM. In some embodiments, the one PM may be visbroken or a peroxide masterbatch. In an embodiment, polymer blends according to the present invention may comprise at least one PBM and at least one PM. The blend may comprise from about 5 to about 35 wt % PBM, or from about 10 to about 30 wt % PBM, or from about 15 to about 20 wt % PBM. The blends may comprise from about 65 to about 95 wt % PM. The polymer blends can be made by dry-blending a PBE and/or PBM and/or PM, or by metering the components directly into an extruder at the desired ratio.

A variety of additives may be incorporated into the polymer blends described herein, depending upon the intended purpose. For example, when the blends are used to form fibers and nonwoven fabrics, such additives may include but are not limited to stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Nucleating agents include, for example, sodium benzoate and talc. Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Further, in some exemplary embodiments, additives may be incorporated into the polymer blends directly or as part of a masterbatch, i.e., an additive package containing several additives to be added at one time in predetermined proportions. In one or more embodiments herein, the fiber of the present invention further comprises a masterbatch comprising a slip agent. The masterbatch may be added in any suitable amount to accomplish the desired result. For example, a masterbatch comprising a slip additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the masterbatch. In an embodiment, the masterbatch comprises erucamide as the slip additive.

Fibers, Nonwoven Compositions, and Laminates Prepared from Polymer Blends

The polymer blends described herein are particularly useful in meltspun (e.g., meltblown or spunbond) fibers and nonwoven compositions (e.g., fabrics). As used herein, "meltspun nonwoven composition" refers to a composition having at least one meltspun layer, and does not require that the entire composition be meltspun or nonwoven. In some embodiments, the nonwoven compositions additionally comprise one or more layers positioned on one or both sides of the nonwoven layer(s) comprising the polymer blend.

The present invention is directed not only to fibers and nonwoven compositions, but also to processes for forming nonwoven compositions comprising the polymer blends described herein. In one or more embodiments, such methods comprise the steps of forming a molten polymer composition comprising a blend of at least one PBM and/or PM and at least one PBE or a blend of at least one PM and at least one PBE, as described above, and forming fibers comprising the polymer blend. In some embodiments, the methods further comprise forming a nonwoven composition from the fibers.

In some embodiments, the nonwoven composition formed from the polymer blend is employed as a facing layer M', for instance when the configuration is M'MM'-Laminate. The process may then further comprise the steps of forming the facing layer, and then forming a nonwoven elastic layer on the facing layer. For example, the nonwoven elastic layer may be formed by meltspinning or meltblowing a layer of molten polymer onto the facing layer. Optionally, an additional facing layer may then be disposed upon the opposite side of the elastic layer, such that the elastic layer is sandwiched between the facing layers. In one or more embodiments, the elastic layer or layers may comprise a PBE, for instance M when the configuration is M'MM'-Laminate.

In certain embodiments, nonwoven compositions comprising the polymer blends may be described as extensible. "Extensible," as used herein, means any fiber or nonwoven composition that yields or deforms (i.e., stretches) upon application of a force. While many extensible materials are also elastic, the term extensible also encompasses those materials that remain extended or deformed upon removal of the force. Fabric layers containing the blends described herein are useful as extensible facing layers in combination with an elastic core layer, which may be a film or a nonwoven layer. When an extensible facing layer is used in combination with an elastic core layer, the extensible layer may permanently deform when the elastic layer to which it is attached stretches and retracts, creating a wrinkled or textured outer surface which gives an additional soft feel that is particularly suited for articles in which the facing layer is in contact with a wearer's skin.

The fibers and nonwoven compositions of the present invention can be formed by any method known in the art. For example, the nonwoven compositions may be produced by a spunmelt process. In certain embodiments herein, the layer or layers of the nonwoven compositions of the invention are produced by a spunbond process. When the compositions further comprise one or more elastic layers, the elastic layers may be produced by a meltblown process, by a spunbond or spunlace process, or by any other suitable nonwoven process.

The fibers may be monocomponent fibers or bicomponent fibers. Preferably, the fibers are monocomponent fibers, meaning that the fibers have a consistent composition throughout their cross-section.

In addition to good extensibility and elongation, fibers comprising the blends described herein may also be used to produce fabrics that have improved aesthetics. For example, the fabrics may have an improved feel and softness. Without being bound by theory, it is believed that fabrics produced using the blends described herein have lower bending modulus, due to lower crystallinity, which improves the softness or feel of the fabric, which may improve the ultrasonic or thermobonding characteristics of the nonwoven fabric. Fabrics made from fibers comprising the blends described herein may have improved softness, as measured by a Handle-O-Meter. In an embodiment, it is appreciated that the present fiber can be used to for coform applications, such as used in wipes and diapers.

As used herein, "meltblown fibers" and "meltblown compositions" (or "meltblown fabrics") refer to fibers formed by extruding a molten thermoplastic material at a certain processing temperature through a plurality of fine, usually circular, die capillaries as molten threads or filaments into high velocity, usually hot, gas streams which attenuate the filaments of molten thermoplastic material to reduce their diameter, which may be to microfiber diameter. Thereafter, the meltblown fibers are carried by the high velocity gas stream and are deposited on a collecting surface to form a web or nonwoven fabric of randomly dispersed meltblown fibers. Such a process is generally described in, for example, U.S. Pat. Nos. 3,849,241; 6,268,203; and 7,081,299.

Commercial meltblown processes utilize extrusion systems having a relatively high throughput, in excess of 0.3 grams per hole per minute ("ghm"), or in excess of 0.4 ghm, or in excess of 0.5 ghm, or in excess of 0.6 ghm, or in excess of 0.7 ghm. Nonwoven compositions may be produced using commercial meltblown processes, or a high pressure meltblown process available from Biax-Fiberfilm Corporation, or in test or pilot scale processes. Preferably, the nonwoven compositions of the present invention are produced using commercial meltblown processes. In one or more embodiments of the present invention, the fibers used to form the nonwoven compositions are formed using an extrusion system having a throughput rate of from about 0.01 to about 3.0 ghm, or from about 0.1 to about 2.0 ghm, or from about 0.2 to about 1.2 ghm.

In a typical spunbond process, polymer is supplied to a heated extruder to melt and homogenize the polymers. The extruder supplies melted polymer to a spinneret where the polymer is fiberized as passed through fine openings arranged in one or more rows in the spinneret, forming a curtain of filaments. The filaments are usually quenched with air at a low temperature, drawn, usually pneumatically, and deposited on a moving mat, belt or "forming wire" to form the nonwoven composition. See, for example, U.S. Pat. Nos. 4,340,563; 3,692,618; 3,802,817; 3,338,992; 3,341,394; 3,502,763; and 3,542,615. The term spunbond as used herein is meant to include spunlace processes, in which the filaments are entangled to form a web using high-speed jets of water (known as "hydroentanglement").

The nonwoven layer that comprises the blend of the PBM and/or PM and the PBE or the blend of the PM and the PBE or the blend of the PBM and PM described herein may be a single layer, or may be part of a multilayer laminate. One application is to make a laminate (or "composite") from meltblown ("M") and spunbond ("S") nonwoven compositions, having the advantage of strength from the spunbonded component and greater barrier properties of the meltblown component. In such applications, the nonwoven layer that comprises the blend of the PBM and/or PM and the PBE may be particularly useful as an outer spunbond layer and the nonwoven layer that comprises the blend of the PBM and the PM may be particularly useful as an inner meltblown layer. A typical laminate or composite has three or more layers, a meltblown layer(s) sandwiched between two or more spunbonded layers, or "SMS" nonwoven composites. Examples of other combinations are SSMMSS, SMMS, SMMSS, and SMMMS composites. Another application is to make a laminate from multiple meltblown nonwoven compositions, such as a M'MM'-Laminate composite. In such applications, the nonwoven layer that comprises the blend of the PBM and the PM may be particularly useful as the outer meltblown layer M'. Composites can also be made of the meltblown or spunbond nonwovens of the invention with other materials, either synthetic or natural, to produce useful articles.

In certain embodiments, a nonwoven laminate composition may comprise one or more elastic layers comprising a PBE and further comprise one or more facing layers comprising the PBM and/or PM and PBE blend or may comprise one or more elastic layers comprising a PBE and further comprise one or more facing layers comprising the PM and PBE blend, as described herein, positioned on one or both sides of the elastic layer(s). In some embodiments, the elastic layers and the facing layers may be produced in a single integrated process, preferably a continuous process. For example, a spunmelt process line may incorporate meltblown technology such that multilayer nonwoven laminates are produced that contain one or more meltblown elastic layers laminated to one or more other spunbond layers (which may be elastic or inelastic) in a single continuous integrated process.

The nonwoven products described above may be used in many articles such as hygiene products including, but not limited to, diapers and baby wipes, training pants, puppy pads, feminine care products, and adult incontinence products. The nonwoven products may also be used in medical products such as sterile wrap, isolation gowns, operating room gowns, surgical gowns, surgical drapes, first aid dressings, and other disposable items. In particular, the nonwoven products may be useful in the intermediate melt-blown layer for medical gowns having a SMS configuration. The nonwoven products may also be useful as facing layers for medical gowns, and allow for extensibility in the elbow area of the gown. The nonwoven products made with the PBM and PBE may also be useful in disposable protective clothing, and may add toughness to elbow and knee regions of such clothing and products made with the PBM and PM may add flexibility and softness to the fabric of such clothing. The nonwoven products may also be useful as protective wrapping, packaging or wound care. The nonwoven products may also be useful in geotextile applications, as the fabric may have improved puncture resistance in that the fabric will deform instead of puncture, as illustrated by the elongation values of FIGS. 10A and 10B.

In an embodiment of the present invention, it is appreciated that the inventive blend of the PBM and the PM can improve the sound insulation properties of the resultant melt blown fabric. Specifically, it is appreciated that the addition of PBM to PM allows for better dissipation and/or absorption of energy from sound waves, in applications such as automotive the nonwoven products may also be used to improve the sound insulation of automobiles, appliances, ceilings, floors, aircrafts, and other home furnishings.

In an embodiment, the polymer blend of the PBM and PM of the invention described herein can be used as molten feed material for injection molding apparatuses generally known in the art to construct a variety of plastic-based articles, e.g., packaging materials, automobile parts, furniture, stationery, and toiletries.

In some embodiments, the polymer blends are used to form an injection molded article by a process that generally includes the steps of adjusting a mold, filling a mold with the molten polymer blend, and cooling the article constructed therefrom. For example, the molten polymer blend may be injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled, for example, between 10° C. and 70° C. The temperature will depend on the desired gloss and appearance desired for the injection molded article. Typical cooling times are from 10 to 30 seconds, depending on article's thickness. Finally, the mold is opened and the shaped article is ejected.

The polymer blends useful for injection molded articles may further comprises one or more additive components in addition to the PBM and PM components described above. Various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the article.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The following test methods were used in the Examples.

The melt flow rate (MFR) of the polymer samples was measured according to ASTM D-1238, Condition L, at 230° C. using a 2.16 kg load. The MFR is reported in "g/10 min."

"Permanent Set" is a measure of the elastic recovery of a material. Specifically, it is the amount of strain remaining in a sample after retraction from a specified strain expressed as a percentage of the specified strain. The elongation remaining in the sample at zero load after retraction (as determined by the intercept of the retraction curve with the x-axis) is divided by the maximum elongation the sample was stretched during that cycle. Generally, a lower permanent set is preferred.

"Retractive Force" is the force to return an elastic material back to its original state. Specifically, the retractive force as measured in the present invention is the force exerted by a sample after stretching to a given elongation and allowing the sample to retract to one-half of that elongation. For fabrics made into nonwoven hygiene applications (such as diapers), generally a low retractive force is preferred to avoid skin marks and rashes as the material returns to its original state after being stretched. Retractive force is measured in Newtons (N).

"Total Hand" is a measure of the combined effect of surface friction and flexibility of sheeted materials in both the CD and MD, as well as the top and bottom sides. For fabrics made into nonwoven hygiene applications (such as a baby diaper), a lower Total Hand value corresponds to a soft feeling when the fabric is contacted with skin. Total Hand is measured in grams, using a Handle-O-Meter instrument.

"Hydrohead" is the hydrostatic pressure required for a liquid to penetrate a medium. For fabrics made into non-woven hygiene applications (such as diapers), generally a higher Hydrohead is preferred to prevent liquids from penetrating the diaper. Hydrohead is measured in mBar and is generally measured in accordance with INDA IST 80.6. For purposes of this invention, Hydrohead tests were performed on a Textest FX 3000-III instrument at a rate of 60 mBar/min. The pressure reported in this invention is the $3^{rd}$ drop value.

"Air Permeability" is the measure of the flow of air through a medium and generally correlates with the pore size of the medium. Lower Air Permeability values, similar to high Hydrohead values, can be indicative of the impenetrability of a material through a fabric medium. Air Permeability is measured in $ft^3$/min or $cm^3$/sec using a method based on ASTM D737. For purposes of this invention, Air Permeability tests were performed on a Textest 3300-III instrument at a temperature of 23° C.

The tensile properties of the fabrics (CD/MD fabric strength and elongation) were measured using a method based on EDANA Option B (WSP 110.4). The samples were 50 mm wide with a jaw separation (gauge length) of 200 mm. The crosshead speed was 100 mm/min.

The PBMs identified in Table 1 (PBM 1 and PBM 2) were used in the examples. Each PBM used was prepared by the process described herein.

TABLE 1

PBM Compositions

| Sample # | Viscosity (cP at 190° C.) | MFR (g/10 min) *estimated | $C_2$ Content (wt %) | Density (g/cm$^3$) |
|---|---|---|---|---|
| PBM 1 | 4,000 | 3,500 | 12.5 | 0.879 |
| PBM 2 | 8,000 | 2,000 | 11.5 | 0.879 |

The PMs identified in Table 2 (PM 1, PM 2, and PM 3) were used in the examples. The PMs used were prepared by the process described herein.

TABLE 2

PM Composition

| Sample # | Viscosity (cP at 190° C.) | MFR (g/10 min) |
|---|---|---|
| PM 1 | 6,000 | 2,500 |
| PM 2 | 13,900 | 1,550 |
| PM 2-V* | <13,900 | >1,550 |
| PM 3 | 12,000 | 1,550 |

*PM 2-V is a masterbatch of PM 2 prepared with a 3 wt % peroxide masterbatch.

The PBEs identified in Table 3 (PBE 1, PBE 2 and PBE 3) were used in the examples. Each PBE used was prepared by the process described herein. PBE 3 in Table 3 has a higher MFR than PBE 1 and PBE 2 because it is a post-reactor blend of a PBE and a homopolymer polypropylene and underwent CR.

TABLE 3

PBE Compositions

| Sample # | Viscosity (cP at 190° C.) | MFR (g/10 min) | $C_2$ Content (wt %) |
|---|---|---|---|
| PBE 1 | 6,000,000 | 48 | 13 |
| PBE 2 | 2,500,000 | 80 | 15 |
| PBE 3 | 285,000 | 290 | 13 |

The Polymer Blends identified in Table 4 include inventive and comparative Polymer Blends used in the examples. Each inventive Polymer Blend used was prepared by the process described herein.

TABLE 4

Polymer Blend Compositions

| Sample # | PBE | PBE (wt %) | PBM | PBM (wt %) | PM | PM (wt %) | Estimated Blend MFR (g/10 min) |
|---|---|---|---|---|---|---|---|
| 1 | PBE 1 | 50 | PBM 1 | 50 | None | None | 300 |
| 2 | PBE 1 | 60 | PBM 2 | 40 | None | None | 280 |
| 3 | PBE 1 | 54 | PBM 2 | 36 | PM 1 | 10 | |
| 4 | PBE 1 | 60 | PBM2 | 25 | PM 1 | 15 | |
| 5 | PBE 1 | 90 | None | None | PM 2-V | 10 | |
| 6 | PBE 1 | 95 | None | None | PM 2-V | 5 | |
| 7 | None | None | PBM 1 | 5-10 | PM 3 | 90-95 | |
| 8 | None | None | PBM 1 | 7-15 | PM 3 | 85-93 | |
| 9 | None | None | PBM 1 | 10-20 | PM 3 | 80-90 | |
| 10 | None | None | PBM 2 | 4-10 | PM 3 | 90-96 | |
| 11 | None | None | PBM 2 | 7-20 | PM 3 | 80-93 | |
| 12 | None | None | PBM 2 | 10-30 | PM 3 | 70-90 | |
| C1 | PBE 1 | 100 | None | None | None | None | 48 |
| C2 | PBE 2 | 100 | None | None | None | None | 80 |
| C3 | PBE 3 | 100 | None | None | None | None | 290 |
| C4 | None | None | None | None | PM 3 | 100 | |

The Polymer Blends of Table 4 were melt-blown to prepare fabric compositions for testing of hysteresis parameters for Samples 1-6 and $C_1$-$C_3$ and handle, air permeability, and hydrohead parameters for Samples 7-12 and C4. Meltblown fibers were prepared using a meltblown process well known in the art for non-woven fabric production. An overview of the process may be obtained from *Melt Blown Process*, Melt Blown Technology Today 7-12 (Miller Freeman Publ., Inc. 1989). In addition, U.S. Pat. No. 7,081,299 discloses the to conventional melt-blowing process, the content of which is incorporated herein by reference.

Specifically the melt blown fabrics prepared using the Polymer Blends 1-12 of Table 4 were produced on a 1-meter wide Reicofil™ melt-blown pilot line including a meltblown machine with an extruder L/D of 30:1 and a 1-meter wide die. The die had a single row of capillaries with 35 holes/inch and a capillary diameter of 0.4 mm. The set back/air gap used in the die was 1.2 mm/1.2 mm. A die-to-collector distance (DCD) of 500 mm was used for Blends 1-6 and a DCD of 200 mm was used for Blends 7-12. Blends 1-6 were extruded at different temperatures: 255, 270, and 285° C., corresponding to an extrusion temperature profile of 50/230/255/255/255° C., 50/240/270/270/270° C., and 50/220/260/285/285° C., respectively; Blends 7-12 were extruded at different die temperatures: 255, 270, and 295° C., when feasible. The screen changer, downstream piping and die temperature setpoints were kept at same temperature as the final extruder temperature setpoint. The melt temperature of the polymer varied depending on viscosity and temperature profile. The materials were extruded at rates ranging from about 0.5 grams/hole/min (ghm) to about 1.2 ghm generating die pressures of about 6 bar up to about 32 bar depending on the material and temperature profile, for Samples 1-6, and at rates of about 0.4 ghm to 0.6 ghm for Samples 7-12. The maximum pressure for the die was set at 500 psi (~34 bar) to avoid potential damage to the die at higher pressures. The pressurized process air was heated to a temperature similar to that of the die. Air rates were adjusted to obtain reasonable uniformity without producing "fly" or drips. Depending on the material, air rates from about 500 m³/hr to about 1450 m³/hr were used, for Samples 1-6 and at air rates from 300 m³/hr to 1000 m³/hr for Samples 7-12. The fabrics were meltblown onto a 12 gsm spunbond polyester scrim (obtained from OXCO) to prevent the MB fabrics from potentially sticking to the forming belt on the MB equipment for Samples 1-6 and were produced with a target basis weight of 25 gsm for Samples 7-12. The fabrics were wound onto rolls and doffed for later testing.

Figure 3:
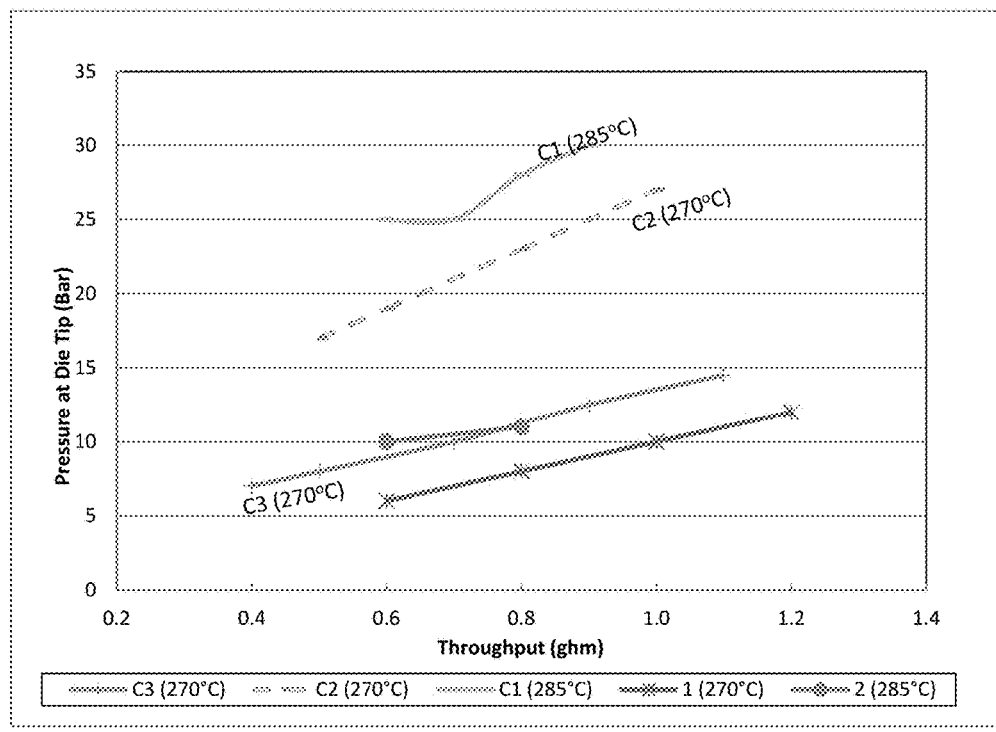
FIG. 3 shows processability parameters for polymer blends for nonwoven applications with a propylene-modifier.
Figure 5:
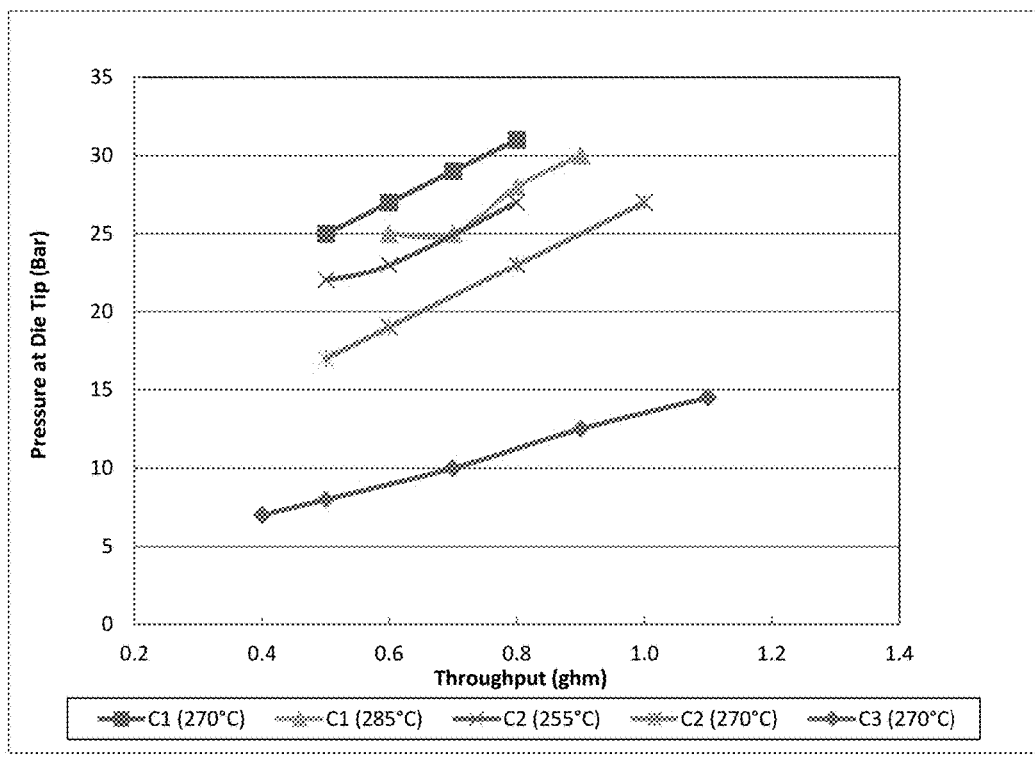
FIG. 5 shows processability parameters for conventional ultra-high and low MFR propylene-based elastomers.

FIG. 5 illustrates the processability parameters of certain PBEs. PBEs with lower MFR, such as C1 and C2, require a much higher die pressure for a given throughput rate. For the pilot plant reproduction of the process to prepare the claimed fibers, the maximum die pressure of the equipment is about 35 bar. Increasing the process temperature of the PBE can reduce the die pressure, as seen in FIG. 3 by comparing C1 at 270° C. to C1 at 285° C. and by comparing C2 at 255° C. to C2 at 270° C. However, increasing the process temperature can accelerate the thermal degradation of the PBE and increase the likelihood of hot fibers sticking to the processing equipment. FIG. 3 shows that higher MFR PBEs, such as C3 display favorably lower die pressures at a given throughput. Accordingly, by increasing the MFR of otherwise low MFR PBE grades, the inventors have discovered that the processability of the resulting fibers can be improved without compromising product properties.

FIGS. 1 and 3 show the processability parameters for comparative and inventive polymer blend compositions. Samples 1-4 displayed favorably lower die pressure profiles at a given throughput rate as a result of the added PBM and/or PM to increase the MFR of the polymer blend. Samples 5-6 displayed favorably lower die pressure profiles at a given throughput rate as a result of the added PM to increase the MFR of the polymer blend. FIG. 1 indicates that adding a PBM and/or PM (or visbroken/peroxide masterbatch PM) to an otherwise low MFR PBE can improve processability parameters, compared to low MFR PBEs (such as C1) or moderate MFR PBEs (such as C2).

Figure 2A:
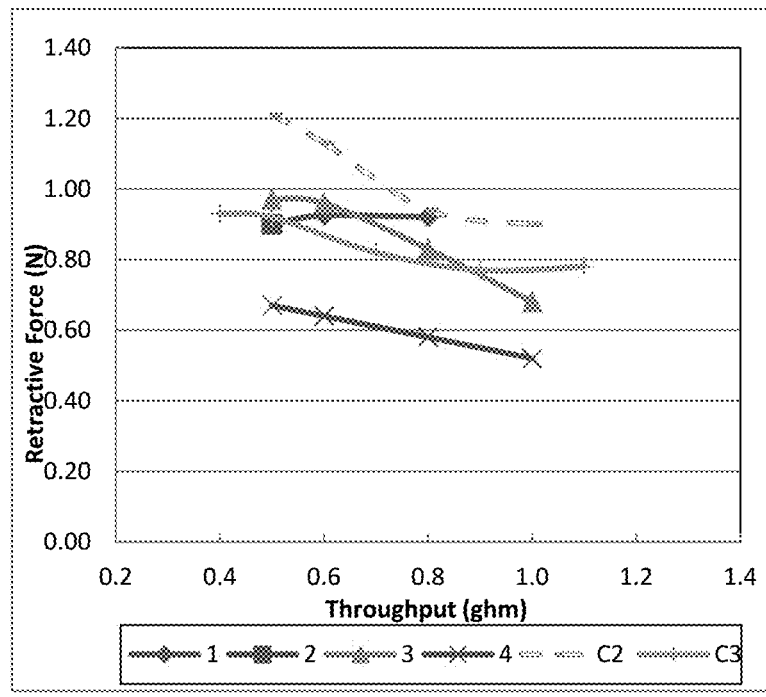
FIG. 2 shows hysteresis parameters for polymer blends for nonwoven applications with a polymer blend modifier.
Figure 2B:
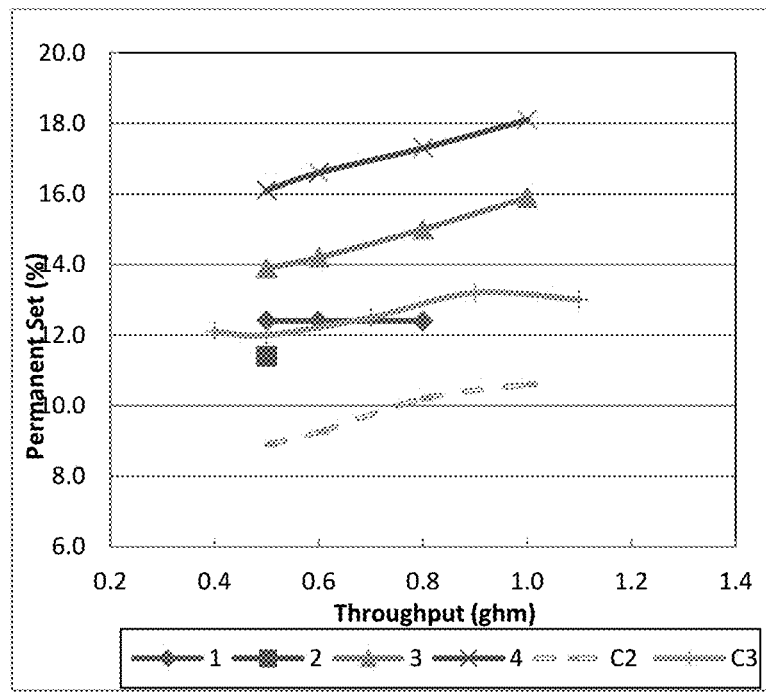
Figure 4A:
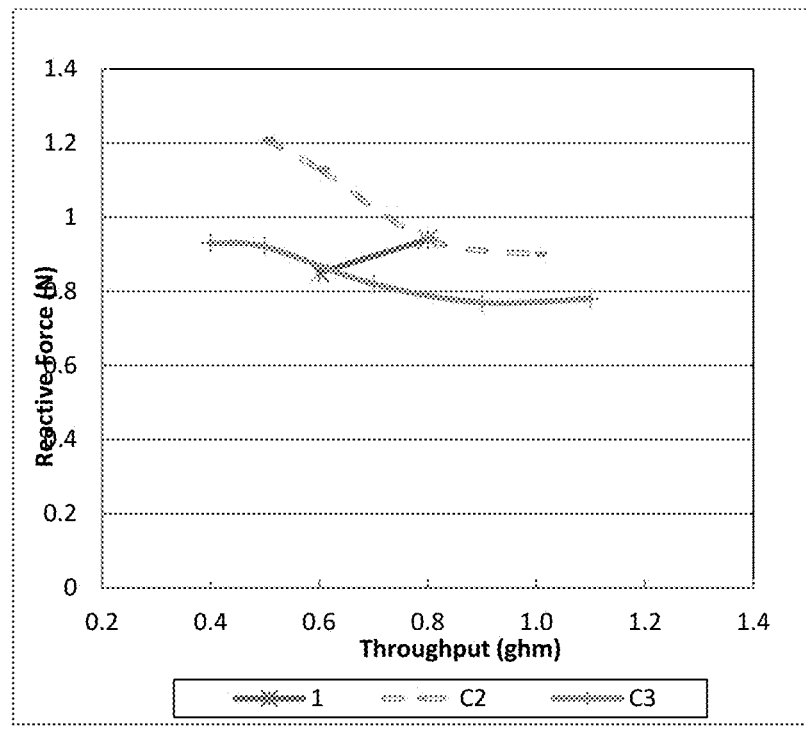
FIG. 4 shows hysteresis parameters for polymer blends for nonwoven applications with a propylene-modifier.
Figure 4B:
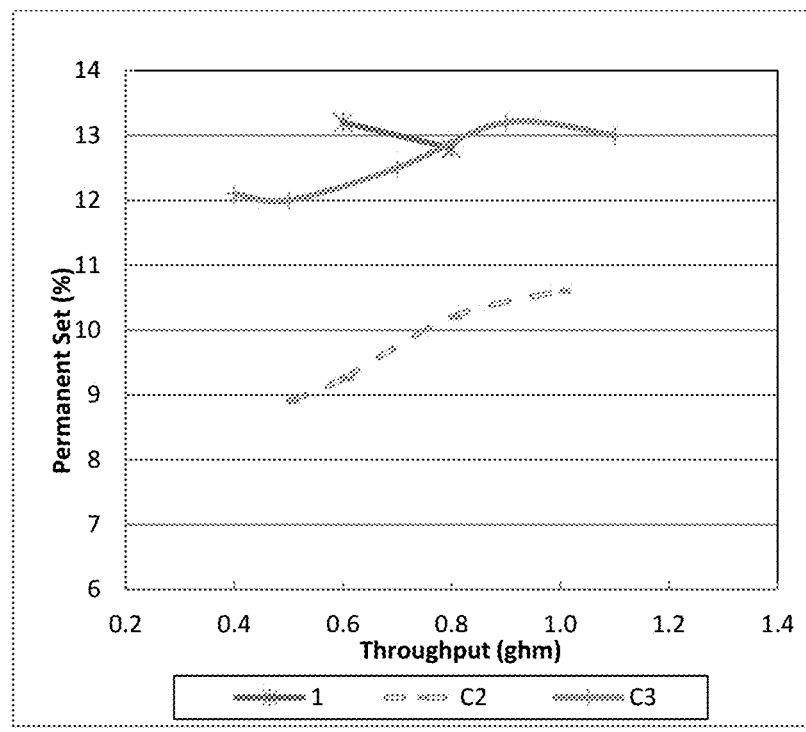

FIGS. 2 and 4 show the hysteresis parameters of fabrics prepared using the polymer blend of the invention. Specifically, FIGS. 2A and 4A show the retractive force as a function of the throughput rate and FIGS. 2B and 4B show the permanent set as a function of the throughput rate. FIGS. 2A and 4A illustrate that inventive polymer blend samples displayed relatively constant or decreasing retractive force as a function of throughput. FIGS. 2B and 4B illustrate that polymer blends with higher homopolymer polypropylene content, such as Sample 3 having 10 wt % PM2 and Sample 4 having 15 wt % PM2, exhibit a higher permanent set. While C2 displayed a very low permanent set, as discussed above, FIG. 1 shows an unfavorably high processability conditions for C2. Inventive polymer blend samples displayed a favorably low permanent, similar to that of ultra-high MFR Sample C3.

Figure 6A:
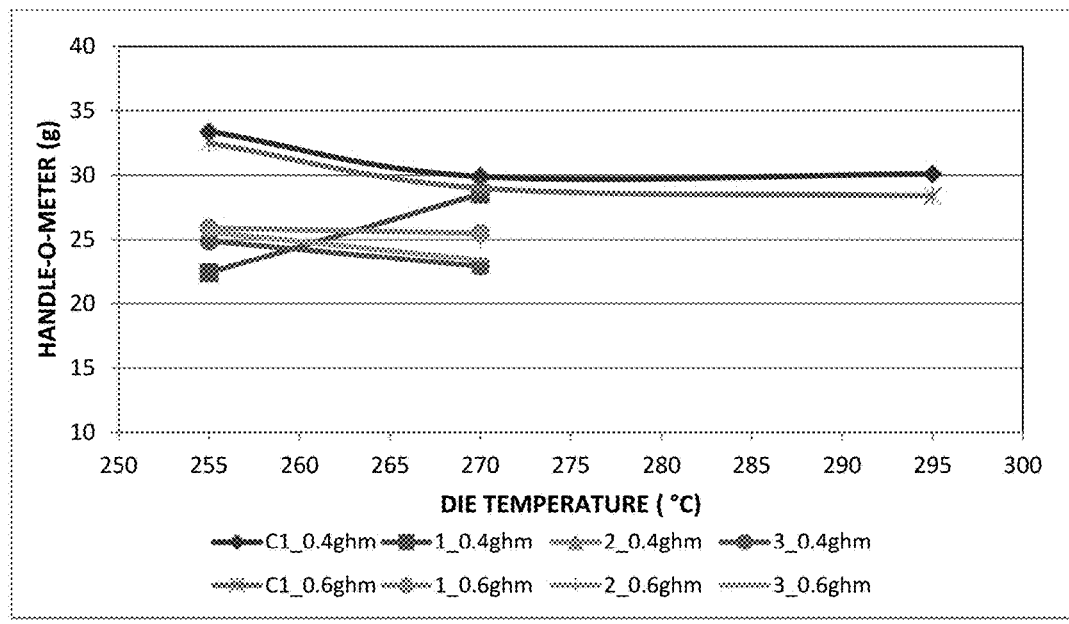
FIG. 6 shows handle parameters for polymer blends for nonwoven applications.
Figure 6B:
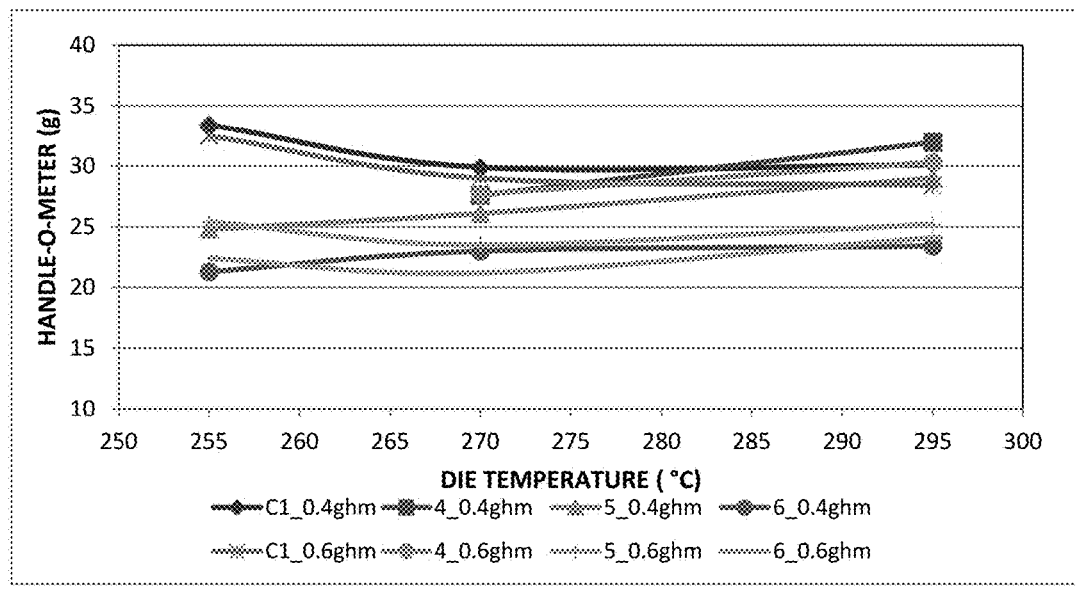

FIG. 6 shows Total Hand for MB fabrics made from the polymer blends. Specifically, FIG. 6A shows Total Hand values for fabrics made from for polymer blends with various amounts of PBM 1 and FIG. 6B shows Total Hand values for fabrics made from polymer blends with various amounts of PBM 2. FIG. 6 indicates that the addition of PBM, at any range, improves the softness of the resultant fabric. The throughput rate of the extruder, at 0.4 ghm or 0.6 ghm, generally does not alter the Total Hand. Including Sample 12 in the polymer blend, and extruding the blend at either throughput value, provided the softest fabric of all samples tested, as indicated in FIG. 6B.

Figure 7A:
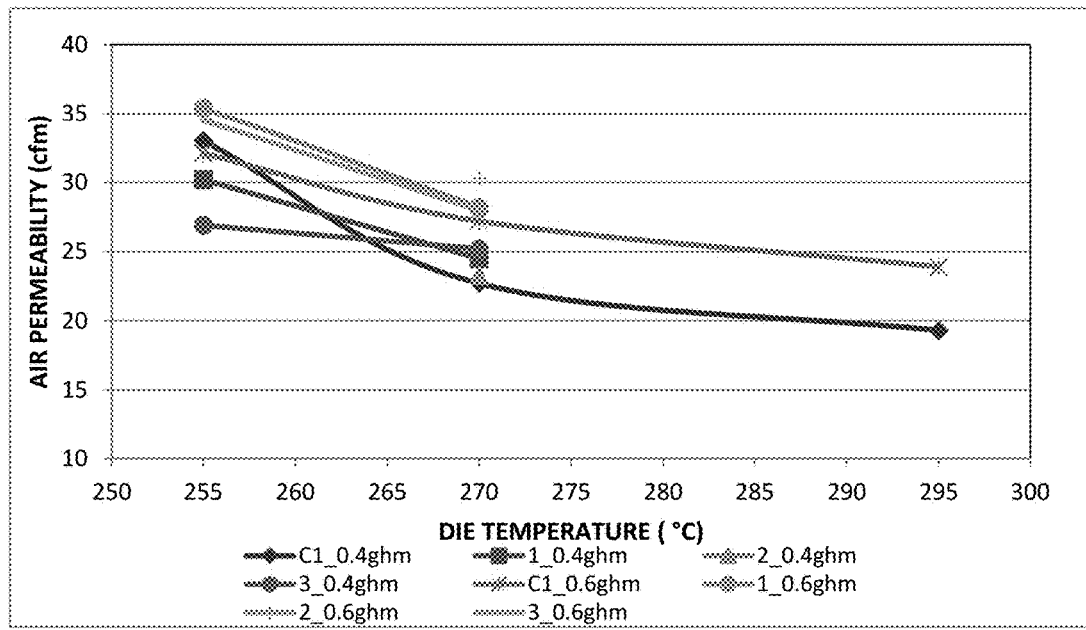
FIG. 7 shows air permeability for polymer blends for nonwoven applications.
Figure 7B:
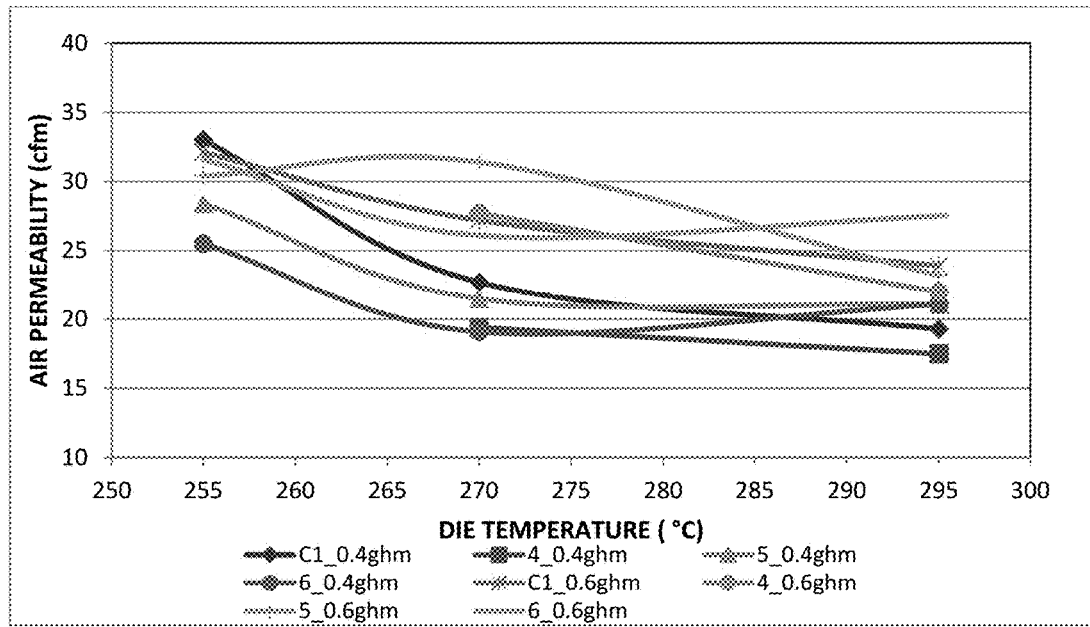

FIG. 7 shows air permeability for polymer blends for nonwoven applications. Specifically, FIG. 7A shows air permeability values for polymer blends with various amounts of PBM 1 and FIG. 7B shows air permeability values for polymer blends with various amounts of PBM 2. FIG. 7 indicates that the addition of PBM, in many cases, results in a lower air permeability and therefore smaller pore size of the fabric. Generally, air permeability values increase with higher extruder throughput rate, for all polymer blend samples.

Figure 8A:
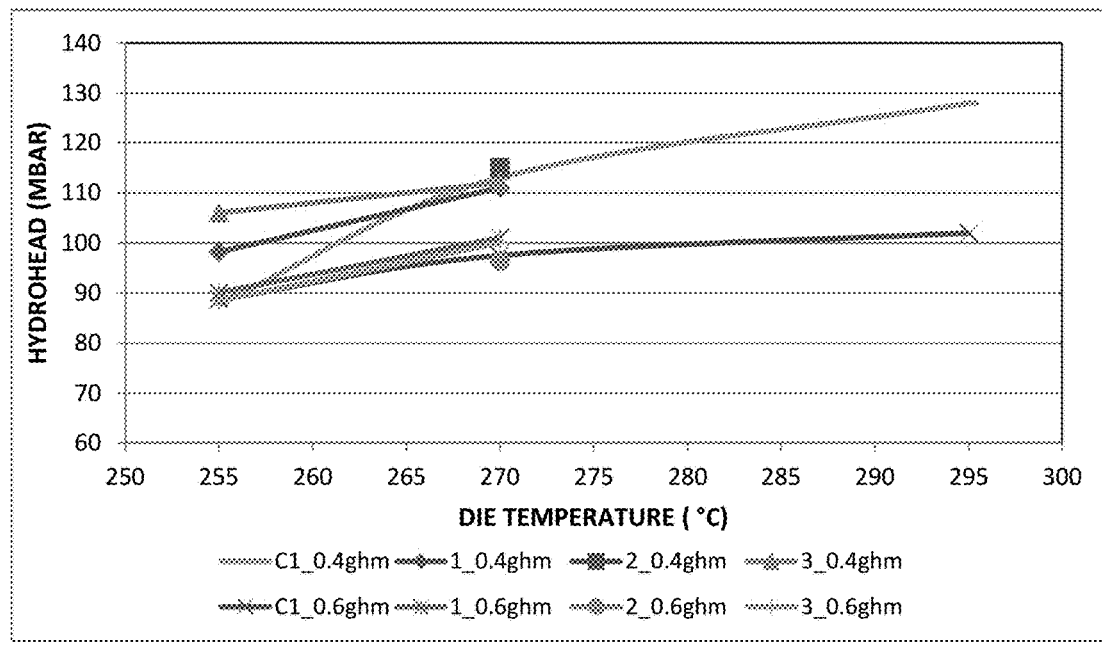
FIG. 8 shows hydrohead values for polymer blends for nonwoven applications.
Figure 8B:
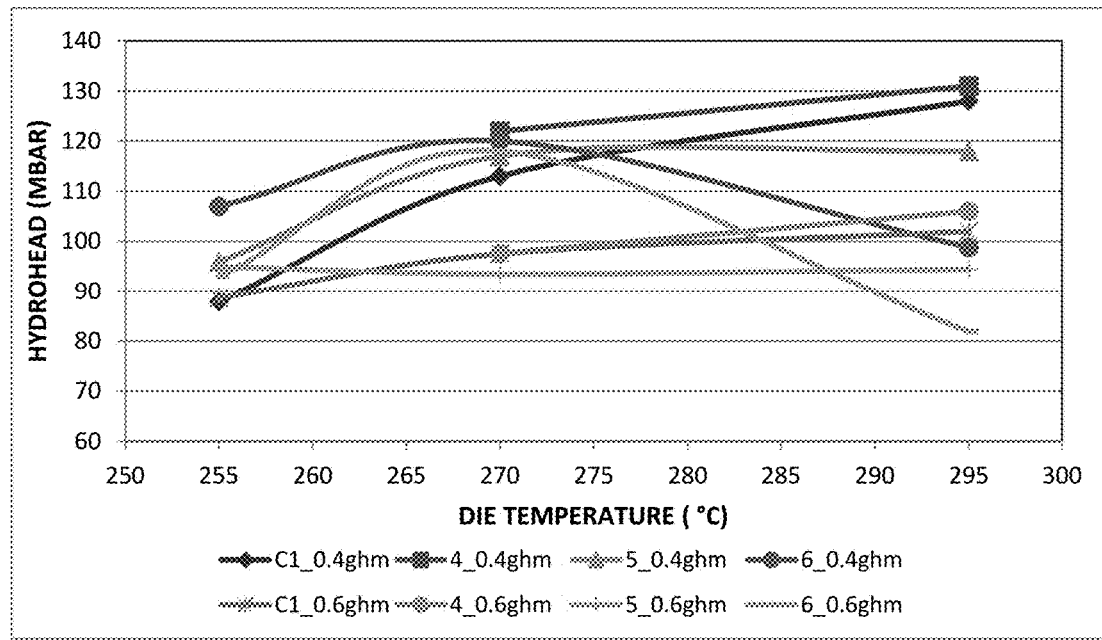

FIG. 8 shows hydrohead values for polymer blends for nonwoven applications. Specifically, FIG. 8A shows hydrohead values for polymer blends with various amounts of PBM 1 and FIG. 8B shows hydrohead values for polymer blends with various amounts of PBM 2. FIG. 8 indicates that the addition of PBM, in most cases, results in a higher hydrohead (hence less likely that a liquid will penetrate the fabric). Overall, FIGS. 7 to 9 indicate that the addition of various amounts of PBM to PBE can improve the softness without unduly compromising liquid barrier properties, as compared to fabrics composed solely of PM components.

Figure 9A:
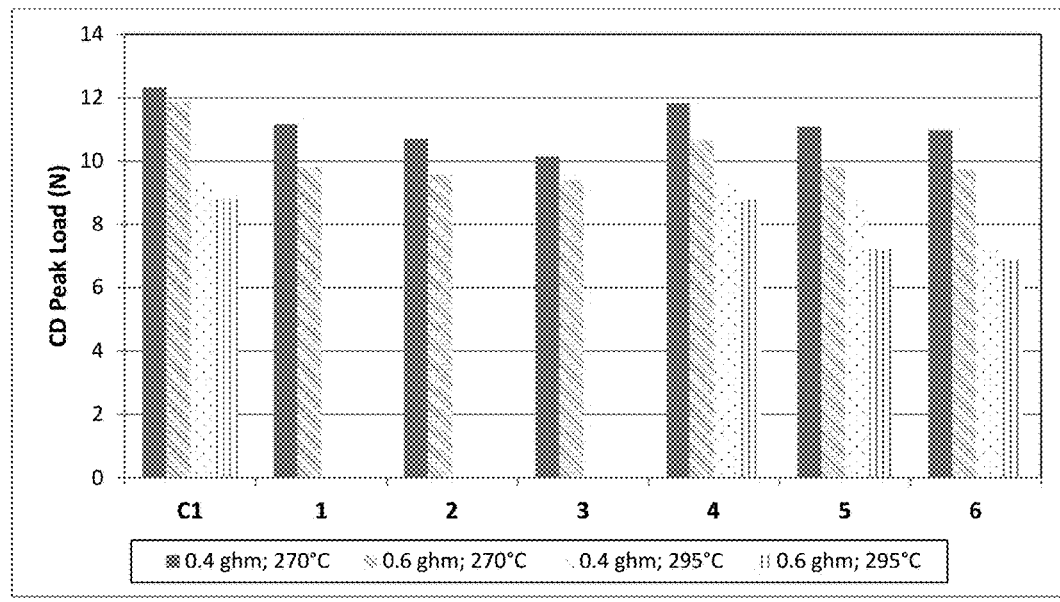
FIG. 9 shows the fabric strength of nonwovens made from polymer blends.
Figure 9B:
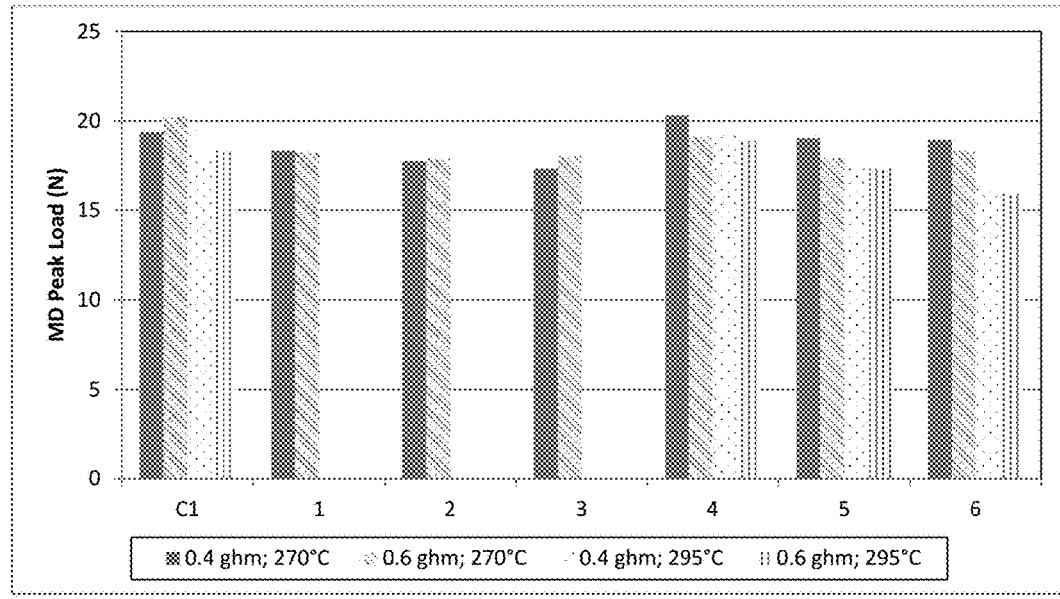

FIG. 9 shows the fabric strength of nonwovens made from polymer blends at various die temperatures and extruder throughput values. Specifically, FIG. 9A shows the cross-direction (CD) fabric strength of nonwovens made from polymer blends with PBM 1 or PBM 2 and FIG. 9B shows the machine-direction (MD) fabric strength of nonwovens made from polymer blends with PBM 1 or PBM 2. In general, CD fabric strength decreases slightly with the addition of PBM 1 or PBM 2, but MD fabric strength is generally not significantly affected with the addition of PBM 1 or PBM 2.

Figure 10A:
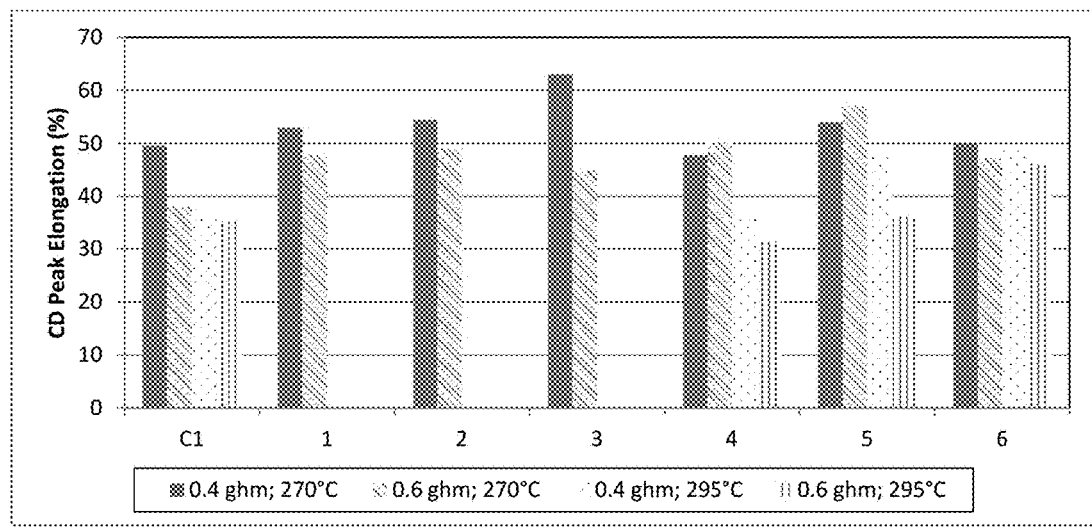
FIG. 10 shows the fabric elongation of nonwovens made from polymer blends.
Figure 10B:
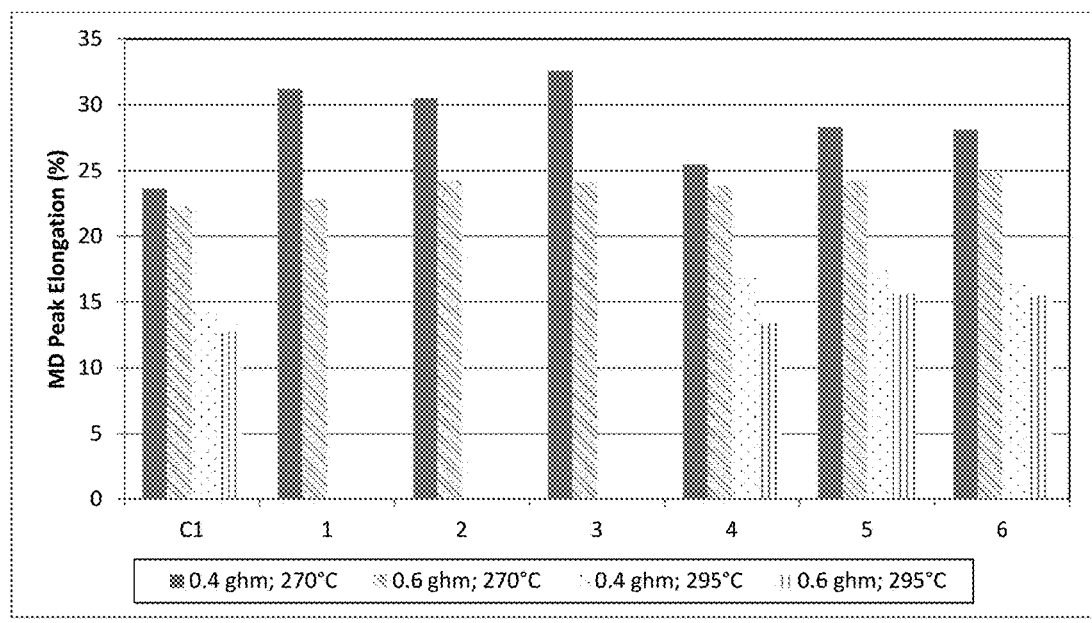

FIG. 10 shows the fabric elongation of nonwovens made from polymer blends at various die temperatures and extruder throughput values. Specifically, FIG. 10A shows the CD fabric elongation of nonwovens made from polymer blends with PBM 1 or PBM 2 and FIG. 10B shows the MD fabric elongation of nonwovens made from polymer blends with PBM 1 or PBM 2. CD fabric elongation generally improves marginally with the addition of PBM 1 or 7-30 wt % of PBM 2 (Samples 11 and 12). MD fabric elongation generally improves significantly at 0.4 ghm throughput rates and 270° C. die temperature with small amounts of PBM 1 or PBM 2.

Some of the fabrics made from the polymer blend compositions of Table 4 were evaluated for melting behavior (melting temperature, heat of fusion, and heat of crystallization, as measured by DSC methods according to ASTM D 3418-08), as reported below in Table 5. The fabrics were made at 270° C. die temperature at the throughput rates and air rates shown in Table 5. There were multiple melting peaks as denoted by Tm1 and Tm2.

TABLE 5

| | | | 1st Melt | | | 2nd Melt | | | Crystallization | |
|---|---|---|---|---|---|---|---|---|---|---|
| Sample # | Throughput Rate (ghm) | Air Rate (m³/hr) | Tm1 (° C.) | Tm2 (° C.) | ΔHf (J/g) | Tm1 (° C.) | Tm2 (° C.) | ΔHf (J/g) | Tc (° C.) | ΔHc (J/g) |
| 10 | 0.4 | 650 | 156 | 160 | 85 | 153 | 159 | 92 | 112 | −91 |
| 10 | 0.6 | 650 | 156 | 160 | 86 | 153 | 160 | 95 | 111 | −94 |
| 11 | 0.4 | 600 | 157 | 160 | 80 | 153 | 160 | 88 | 112 | −88 |
| 11 | 0.6 | 600 | 156 | 160 | 85 | 152 | 159 | 92 | 111 | −92 |
| 12 | 0.4 | 700 | 156 | 160 | 80 | 152 | 160 | 86 | 111 | −85 |
| 12 | 0.6 | 700 | 156 | 160 | 82 | 152 | 160 | 88 | 111 | −87 |
| C4 | 0.4 | 650 | 157 | 160 | 89 | 154 | 160 | 99 | 112 | −98 |
| C4 | 0.6 | 900 | 156 | 160 | 90 | 154 | 160 | 100 | 111 | −98 |

The Polymer Blends of Table 5 were melt-blown according to the methods previously described to evaluate the melting behaviors. The peak melting point temperatures (Tm 1 and Tm2 of the 1st Melt) did not vary significantly for fabrics having PBM (Samples 10 to 12) as compared to the Comparative (C4). The heat of fusion and heat of crystallization was lower for all inventive samples having PBM as compared to fabrics having only PM, as might be expected due to the lower crystallinity of PBM as compared to the PM component.

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A fiber comprising a polymer blend of
   (a) about 10 to about 50 wt % of a polymer blend modifier, comprising a first propylene-based polymer, wherein the first propylene-based polymer is a homopolymer of propylene or a copolymer of propylene and ethylene or a $C_4$ to $C_{10}$ alpha-olefin, and a second propylene-based polymer, wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer,
   wherein the polymer blend modifier has a MFR of greater than about 1,000 g/10 min to less than about 10,000 g/10 min; and
   (b) about 50 to about 90 wt % of a propylene-based elastomer, having a MFR of less than about 100 g/10 min.

2. The fiber of claim 1, further comprising a propylene-modifier, comprising a homopolymer of propylene or a copolymer of propylene with from about 0.5 to about 4 wt % ethylene or $C_4$ to $C_{10}$ alpha-olefin comonomer derived units.

3. The fiber of claim 1, wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g.

4. The fiber of claim 1, wherein the propylene-modifier has a MFR of greater than about 100 g/10 min to less than about 10,000 g/10 min.

5. The fiber of claim 1, wherein the propylene-based elastomer has a polydispersity index of about 1.8 to about 3.

6. The fiber of claim 1, wherein the polymer blend modifier has a melt viscosity of about 800 to about 15,000 cP at 190° C.; and wherein the propylene-based elastomer has a melt viscosity of about 50,000 to about 10,000,000 cP at 190° C.

7. A fiber comprising a polymer blend of
   (a) about 5 to about 35 wt % of a polymer blend modifier, comprising a first propylene-based polymer wherein the first propylene-based polymer is a homopolymer of propylene or a copolymer of propylene and ethylene or a $C_4$ to $C_{10}$ alpha-olefin and a second propylene-based polymer wherein the second propylene-based polymer is a homopolymer of propylene or a copolymer of propylene and ethylene or a $C_4$ to $C_{10}$ alpha-olefin, wherein the second propylene-based polymer is different than the first propylene-based polymer, wherein the polymer blend modifier has a MFR of greater than about 1,000 g/10 min to less than about 10,000 g/10 min; and
(b) about 65 to about 95 wt % of a propylene-modifier, wherein the propylene-modifier has a MFR of greater than about 100 g/10 min to less than about 10,000 g/10 min.

8. The fiber of claim 7, wherein the polymer blend modifier has an Mw of about 10,000 g/mol to about 150,000 g/mol.

9. The fiber of claim 7, wherein the polymer blend modifier has a polydispersity index of about 1.5 to about 6.

10. The fiber of claim 7, wherein the polymer blend modifier has a melt viscosity of about 1,000 to about 10,000 cP at 190° C.

11. The fiber of claim 7, wherein the fiber comprises from about 5 to about 30 wt % of the polymer blend modifier.

12. A fiber comprising a polymer blend of
(a) about 5 to about 50 wt % of a propylene-modifier, comprising a homopolymer of propylene or a copolymer or propylene units with from about 0.5 to about 4 wt % ethylene or $C_4$ to $C_{10}$ alpha-olefin comonomer derived units; and
(b) about 50 to about 95 wt % of a propylene-based elastomer, comprising propylene and from about 5 to about 25 wt % units derived from one or more $C_2$ to $C_4$-$C_{12}$ alpha-olefins and has a triad tacticity greater than about 90% and a heat of fusion less than about 75 J/g.

13. The fiber of claim 12, wherein the propylene-modifier has a MFR of greater than about 100 g/10 min to less than about 10,000 g/10 min.

14. The fiber of claim 12, wherein the propylene-modifier is present in the amount of about 5 to about 15 wt % based on the polymer blend.

15. The fiber of claim 12, wherein the propylene-based elastomer has a polydispersity index of about 1.8 to about 3.

16. The fiber of claim 12, wherein the propylene-modifier has a melt viscosity of about 2,000 to about 20,000 cP at 190° C.

17. The fiber of claim 12, wherein the propylene-modifier is visbroken or a peroxide masterbatch.

18. The fiber of claim 12, wherein the fiber has a mono-component structure.

19. The fiber of claim 12, wherein the polymer blend is visbroken or a peroxide masterbatch.

20. A nonwoven composition comprising the fiber of claim 12.

21. The fiber of claim 12, further comprising a slip additive.

22. The fiber of claim 12, wherein the polymer blend has a melt flow rate of about 100 g/10 min to about 5,000 g/10 min.

* * * * *